United States Patent
Davies

(10) Patent No.: US 8,167,338 B2
(45) Date of Patent: May 1, 2012

(54) NON-METALLIC RACEWAY FOR WIRING AND FIBER OPTIC CABLE AND METHOD OF FORMING RACEWAY

(75) Inventor: John Davies, Lakeland, FL (US)

(73) Assignee: Cantex, Inc., Fort Worth, TX (US)

( * ) Notice: Subject to any disclaimer, the term of this patent is extended or adjusted under 35 U.S.C. 154(b) by 321 days.

(21) Appl. No.: 12/236,763

(22) Filed: Sep. 24, 2008

(65) Prior Publication Data

US 2009/0079183 A1     Mar. 26, 2009

Related U.S. Application Data

(60) Provisional application No. 60/960,283, filed on Sep. 24, 2007.

(51) Int. Cl.
 *F16L 13/02* (2006.01)
(52) U.S. Cl. .............. 285/288.1; 285/149.1; 156/304.2; 264/248
(58) Field of Classification Search ............. 285/21.2, 285/21.3, 22, 21.1, 285.1, 288.1, 903, 151.1, 285/149.1; 264/248; 156/304.2
See application file for complete search history.

(56) References Cited

U.S. PATENT DOCUMENTS

| | | |
|---|---|---|
| 1,603,312 A | 10/1926 | Burdette |
| 1,687,811 A | 10/1928 | Warner |
| 1,802,491 A | 4/1931 | Young et al. |
| 1,971,369 A | 8/1934 | Coryell |
| 1,990,077 A | 2/1935 | Kershaw |
| 2,334,105 A | 11/1943 | Leguillion et al. |
| 2,360,950 A | 10/1944 | Kilgour |
| 2,611,722 A | 9/1952 | Everett |
| 2,961,363 A | 11/1960 | Lowes |
| 3,002,871 A | 10/1961 | Tramm et al. |

(Continued)

FOREIGN PATENT DOCUMENTS

DE     36 39 932 A1    6/1988

(Continued)

OTHER PUBLICATIONS

International Search Report dated Dec. 8, 2008 for PCT Appln No. PCT/US2008/011045.

(Continued)

*Primary Examiner* — David E Bochna
(74) *Attorney, Agent, or Firm* — Miles & Stockbridge P.C.; David R. Schaffer; Patrick L. Miller

(57) ABSTRACT

A continuous, non-metallic conduit for conductors, such as electrical wiring and/or fiber optic cable. The continuous conduit being formed from at least one pair of first and second conduits having enlarged ends coupled together. The enlarged ends are belled or otherwise have a diameter greater than that of the straight run (non-belled) portions of the conduit. The enlarged ends of the conduit being coupled together by fusion or welding, and an internal bead or ridge being formed by the coupling process. The enlarged ends are dimensioned such that the internal bead or ridge formed at the junction between the two enlarged ends does not project radially inward to a position equal to or less than the diameter of the straight run portion of the conduits. The continuous conduit is configured to allow the conductor to be passed therethrough such that the conductor does not contact the internal bead or ridge.

10 Claims, 4 Drawing Sheets

U.S. PATENT DOCUMENTS

| | | | |
|---|---|---|---|
| 3,013,925 A | 12/1961 | Larsen |
| 2,642,517 A | 6/1963 | Lindow |
| 3,276,941 A | 10/1966 | Burns |
| 3,359,599 A | 12/1967 | Martin et al. |
| 3,508,766 A | 4/1970 | Kessler et al. |
| 3,552,265 A | 1/1971 | Lucas |
| 3,847,694 A | 11/1974 | Stewing |
| 3,872,894 A | 3/1975 | Streit |
| 3,887,992 A | 6/1975 | Parmann |
| 3,929,541 A | 12/1975 | Spears et al. |
| 3,968,195 A | 7/1976 | Bishop |
| 3,989,778 A | 11/1976 | Osborne |
| 4,057,448 A | 11/1977 | Miller |
| 4,075,268 A | 2/1978 | Nolan |
| 4,089,455 A | 5/1978 | Fellers |
| 4,113,813 A | 9/1978 | Wilson |
| 4,135,961 A | 1/1979 | Yoshizawa et al. |
| 4,258,935 A | 3/1981 | Rodrigo et al. |
| 4,326,327 A | 4/1982 | Cox |
| 4,389,877 A | 6/1983 | Lacey |
| 4,390,384 A | 6/1983 | Turner |
| 4,507,119 A | 3/1985 | Spencer |
| 4,516,971 A | 5/1985 | Spencer |
| 4,610,670 A | 9/1986 | Spencer |
| 4,619,642 A | 10/1986 | Spencer |
| 4,642,155 A | 2/1987 | Ramsey |
| 4,684,789 A | 8/1987 | Eggleston |
| 4,695,335 A | 9/1987 | Lyall |
| 4,752,350 A | 6/1988 | Schuster |
| 4,780,163 A | 10/1988 | Haneline, Jr. et al. |
| 4,786,088 A | 11/1988 | Ziu |
| 4,792,374 A | 12/1988 | Rianda |
| 4,813,160 A | 3/1989 | Kuznetz |
| 4,852,914 A | 8/1989 | Lyall |
| 4,880,579 A | 11/1989 | Murata et al. |
| 4,883,292 A | 11/1989 | Kuroki |
| 4,933,036 A | 6/1990 | Shaposka et al. |
| 4,954,299 A | 9/1990 | Greig et al. |
| 4,963,421 A | 10/1990 | Dickinson et al. |
| 4,981,541 A * | 1/1991 | Stafford ................ 156/158 |
| 4,987,018 A | 1/1991 | Dickinson et al. |
| 5,007,767 A | 4/1991 | Stafford |
| 5,013,376 A | 5/1991 | McElroy, II et al. |
| 5,124,109 A | 6/1992 | Drossbach |
| 5,141,580 A | 8/1992 | Dufour et al. |
| 5,147,697 A | 9/1992 | Ljyuin et al. |
| 5,160,559 A | 11/1992 | Scovil et al. |
| 5,188,697 A | 2/1993 | Lueghamer |
| 5,241,157 A | 8/1993 | Wermelinger et al. |
| 5,279,685 A | 1/1994 | Ivansons et al. |
| 5,328,541 A | 7/1994 | Usui et al. |
| 5,368,809 A | 11/1994 | Steketee, Jr. |
| 5,385,173 A | 1/1995 | Gargiulo |
| 5,399,301 A | 3/1995 | Menendez et al. |
| 5,407,514 A | 4/1995 | Butts et al. |
| 5,464,496 A | 11/1995 | Wilson et al. |
| 5,469,891 A | 11/1995 | Lund et al. |
| 5,489,403 A * | 2/1996 | Hegler et al. ................ 264/248 |
| 5,527,406 A | 6/1996 | Brath |
| 5,546,992 A | 8/1996 | Chick et al. |
| 5,554,332 A | 9/1996 | Schnallinger |
| 5,595,651 A | 1/1997 | Pavel |
| 5,634,672 A * | 6/1997 | Stack et al. ................ 285/21.1 |
| 5,671,952 A | 9/1997 | Ligh |
| 5,720,411 A | 2/1998 | Darby et al. |
| 5,730,472 A | 3/1998 | Krause et al. |
| 5,743,299 A | 4/1998 | Chick et al. |
| 5,778,938 A | 7/1998 | Chick et al. |
| 5,794,662 A | 8/1998 | St. Onge et al. |
| 5,802,689 A | 9/1998 | Sano |
| 5,814,181 A | 9/1998 | Richter et al. |
| 5,824,179 A | 10/1998 | Greig |
| 5,829,793 A | 11/1998 | Svetlik |
| 5,868,438 A | 2/1999 | Svetlik |
| 5,921,587 A | 7/1999 | Lueghamer |
| 5,924,455 A | 7/1999 | Jo et al. |
| 6,068,970 A | 5/2000 | Hosono et al. |
| 6,123,110 A | 9/2000 | Smith et al. |
| 6,126,209 A | 10/2000 | Goddard |
| 6,156,144 A | 12/2000 | Lueghamer |
| 6,156,832 A | 12/2000 | Bertelo et al. |
| 6,201,053 B1 | 3/2001 | Dieckmann et al. |
| 6,228,204 B1 | 5/2001 | Reinhardt et al. |
| 6,228,312 B1 | 5/2001 | Boyce |
| 6,299,820 B1 | 10/2001 | Weinstein |
| 6,394,502 B1 | 5/2002 | Andersson |
| 6,398,264 B1 | 6/2002 | Bryant, III |
| 6,406,063 B1 | 6/2002 | Pfeiffer |
| 6,409,873 B1 | 6/2002 | Baxter |
| 6,550,500 B2 | 4/2003 | Jarvenkylaet et al. |
| 6,550,514 B1 | 4/2003 | Andrew |
| 6,608,142 B1 | 8/2003 | Weng et al. |
| 6,629,547 B1 | 10/2003 | Yamaguchi et al. |
| 6,755,212 B1 | 6/2004 | Anderson et al. |
| 6,769,719 B2 | 8/2004 | Genoni |
| 6,946,050 B2 | 9/2005 | Dojan et al. |
| 6,982,051 B2 | 1/2006 | St. Onge et al. |
| 6,994,766 B2 * | 2/2006 | Temple ................ 156/257 |
| 7,269,520 B2 | 9/2007 | Marti et al. |
| 2001/0048223 A1 | 12/2001 | Campbell |
| 2001/0050278 A1 | 12/2001 | Chenault |
| 2003/0080552 A1 | 5/2003 | Genoni |
| 2004/0074837 A1 | 4/2004 | Vasse et al. |
| 2004/0134592 A1 | 7/2004 | Johnson et al. |
| 2004/0251575 A1 | 12/2004 | St. Onge et al. |
| 2005/0131123 A1 | 6/2005 | Hawrylko et al. |
| 2006/0004399 A1 | 1/2006 | van Ockenburg et al. |
| 2006/0054275 A1 | 3/2006 | Sano et al. |
| 2006/0071365 A1 | 4/2006 | St. Onge et al. |
| 2006/0151042 A1 | 7/2006 | Stringfellow et al. |
| 2007/0068868 A1 | 3/2007 | Vasse et al. |
| 2008/0257604 A1 | 10/2008 | Becker et al. |

FOREIGN PATENT DOCUMENTS

| | | |
|---|---|---|
| DE | 41 31 442 A1 | 3/1993 |
| EP | 1041334 A1 | 10/2000 |
| FR | 1390498 | 2/1964 |
| GB | 2268431 A | 1/1994 |
| JP | 59-93328 A | 5/1984 |
| JP | 61-20725 A | 1/1986 |
| JP | 62-190396 A | 8/1987 |
| JP | 1-110128 A | 4/1989 |
| JP | 2-106325 A | 4/1990 |
| JP | 2-107429 A | 4/1990 |
| JP | 4-229231 A | 8/1992 |
| JP | 6-226062 A | 8/1994 |
| JP | 9-117641 A | 5/1997 |
| JP | 11-077834 A | 3/1999 |
| JP | 2000-33517 A | 2/2000 |
| JP | 2002-21474 A | 1/2002 |
| WO | WO 99/11361 A1 | 3/1999 |
| WO | WO 00/22334 A1 | 4/2000 |
| WO | WO 2008/128154 A1 | 10/2008 |

OTHER PUBLICATIONS

Written Opinion dated Dec. 8, 2008 for PCT Appln No. PCT/US2008/011045.

Carlon Bore-Gard PVC Trenchless Raceway—FAQ's—Frequently Asked Questions.

David J. Woods et al., *Pipeline Rehabilitation with Expanded and Oriented PVC*, Underground Infrastructure Advanced Technology Conference, Washington, DC Dec. 8-9, 2003, available at http://www.undergroundsolutions.com/articles/PipeRehab.pdf.

J.Q. Zhao et al., *Effect of Joint Contamination of the Quality of Butt-Fused High-Density Polyethylene (HDPE) Pipe Joints*, Institute for Research in Construction, National Research Council Canada, NRCC-45337, available at http://www.nrc-cnrc.gc.ca/obj/irc/doc/pubs/nrcc45337/nrcc45337.pdf.

*Polyethylene (PE) Pressure Pipe and Fittings, 4 In. (100 mm) Through 63 In. (1,575 mm), for Water Distribution and Transmission*, American Water Works Association, ANSI/AWWA C906-99, Effective Date Mar. 1, 2000, available at http://www.gajeske.com/documents/resources_docs/AWWA%20Standards.pdf.

ISCO Industries, Products & Services, Fusion Services, available at http://www.isco-pipe.com/products-and-services/fusion-services.aspx.

International Search Report and Written Opinion dated Sep. 12, 2008 for International Application No. PCT/US08/60192.
Final Office Action dated Mar. 3, 2011 for U.S. Appl. No. 12/102,298.
Office Action dated Aug. 25, 2010 for U.S. Appl. No. 12/102,298.
Interview Summary dated Aug. 25, 2010 for U.S. Appl. No. 12/102,298.
Advisory Action dated Aug. 4, 2010 for U.S. Appl. No. 12/102,298.
Interview Summary dated Jul. 15, 2010 for U.S. Appl. No. 12/102,298.
Final Office Action dated Apr. 13, 2010 for U.S. Appl. No. 12/102,298.
Office Action dated Oct. 29, 2009 for U.S. Appl. No. 12/102,298.
Requirement for Restriction/Election dated Jun. 15, 2009 for U.S. Appl. No. 12/102,298.
Non-final Office Action dated Jun. 23, 2011 for U.S. Appl. No. 12/102,298.

* cited by examiner

NON-METALLIC RACEWAY FOR WIRING AND FIBER OPTIC CABLE AND METHOD OF FORMING RACEWAY

CROSS REFERENCE TO RELATED APPLICATIONS

This application claims priority to U.S. Provisional Patent Application Ser. No. 60/960,283 filed Sep. 24, 2007, the entire content of which is hereby incorporated by reference into the present application.

FIELD OF THE INVENTION

The present invention relates to a non-metallic conduit or raceway for conductors, such as electrical wiring and/or fiber optic cable. In particular, the present invention relates to non-metallic conduits having enlarged ends coupled together to form a continuous conduit, wherein the continuous conduit is configured to allow a conductor to be passed therethrough without contacting internal ridges formed at junctions of the coupled-together enlarged ends.

DESCRIPTION OF RELATED ART

Systems for forming or joining conduit or piping sections comprised of polyethylene or polyvinylchloride (PVC) piping have long been in use. U.S. Pat. No. 6,982,051 (hereinafter "the '051 patent") and published application U.S. Patent Pub. No. 2006/0071365 (application Ser. No. 11/244,123) (hereinafter "the '365 publication") disclose a method and apparatus for use in a fusion process for PVC conduit to provide an essentially single piece of PVC conduit. The entire content of each of the foregoing documents is hereby incorporated by reference.

Fused conduit of the type disclosed in the '051 patent and the '365 publication have general applications in methods of water or gas lines. In such applications, little concern is given to an internal bead or ridge formed within joined conduits. As shown and described in the '051 patent and the '365 publication, external and internal beads are formed along the external and internal surfaces of the conduit at the joint of the joined conduit pieces. Each bead may have irregular surfaces and sharp edges. For the internal bead, such irregularity may result in a significant reduction to the inside diameter and may make the conduit unsuitable for carrying electrical wiring or fiber optic cable.

The resultant external bead extending around the fused joint areas can be substantially removed and smoothed for appearance sake. However, the internal bead remains in place because it typically does not significantly adversely affect the flow of liquids or gasses. While the '051 patent suggest that the internal bead may also be removed if leaving it would be adverse to the flow of liquids or gasses, the fact of the matter is that such removal is expensive and generally requires multiple reaming tools. Further, such removal is typically done "blind" within the conduit and success generally cannot be assured. Moreover, such removal (e.g., grinding) of the internal bead may weaken the joint, thereby rendering the conduit unsuitable for use.

In raceways for electrical wiring or fiber optic cable, it is important that the internal surfaces of the raceways do not have internal projections from the fusion process that would obstruct the wiring or cable as it is pulled or pushed through. It is also possible for the wiring or cable to be cut or pierced by the internal projections. In evaluating PVC conduit formed by the process disclosed in the '051 patent and the '365 publication, cut-away sections of the PVC conduit showed internal beading or ridging making it unsuitable for use as raceways for electrical wiring or fiber optic cable.

BRIEF SUMMARY

Exemplary embodiments of the present invention include (i.e., comprise) a non-metallic raceway configured to facilitate passage of a conductor, a method of forming a continuous conduit from a first hollow conduit and a second hollow conduit, and a continuous conduit for housing an electrical or optical conductor.

In one aspect of the present invention, a non-metallic raceway is configured to facilitate passage of a conductor and comprises a pair of non-metallic hollow conduits, including a first non-metallic conduit and a second non-metallic conduit. The first and second non-metallic hollow conduits each have a first belled end with a first inner diameter, a second belled end with the first inner diameter, and a cylindrical portion between the belled ends and with a second inner diameter. The pair of non-metallic hollow conduits is fused together at first belled ends to form a fused portion, and the fused portion includes an internal ridge and an external ridge. The internal ridge has a third inner diameter, and the first, second, and third inner diameters are sized such that a conductor passed through the raceway does not contact the internal ridge. The first inner diameter is greater than the second inner diameter, and the third inner diameter is greater than the second inner diameter and less than the first inner diameter.

In another aspect of the present invention, a method of forming a continuous conduit from a first hollow conduit and a second hollow conduit comprises positioning a bell-shaped end of the first hollow conduit adjacent a bell-shaped end of the second hollow conduit such that respective circumferences of the hollow conduits are substantially axially aligned and substantially permanently fusing the positioned and aligned bell-shaped ends together to form a fuse joint between the bell-shaped ends. The substantially permanently fusing forms an internal protrusion at the fuse joint, the internal protrusion protrudes substantially radially inward and has the third inner diameter, and the internal protrusion does not extend inward to an inner diameter of non-belled portions of the first hollow conduit and the second hollow conduit. The substantially permanently fused first and second hollow conduits forming the continuous conduit are configured so as to prevent a conductor passed through the continuous conduit from contacting the internal protrusion.

Another aspect of the invention includes a continuous conduit for housing an electrical or optical conductor. The conduit comprises a first elongated conduit having a cylindrical portion and enlarged ends with a diameter larger than the cylindrical portion and a second elongated conduit having a cylindrical portion and enlarged ends with a diameter larger than the cylindrical portion. One of the enlarged ends of the first elongated conduit is coupled to one of the enlarged ends of the second elongated conduit, and the coupled enlarged ends forming a joint which includes a protrusion that projects radially inward. The coupled first and second elongated conduits having the joint with the inwardly projecting projection are configured to house the electrical or optical conductor so the conductor does not contact the internal ridge.

The foregoing and other aspects of the present invention, as well as its various features and advantages, will be more readily appreciated from the following detailed description taken in conjunction with the accompanying drawings.

BRIEF DESCRIPTION OF THE DRAWINGS

The accompanying drawings illustrate embodiments of the invention. The invention will be best understood by reading the ensuing specification in conjunction with the drawing figures, in which like elements are designated by like reference numerals, and wherein.

DETAILED DESCRIPTION

The embodiments described below represent non-limiting examples of the present invention.

Generally speaking, the present invention provides (1) a continuous conduit that is configured to facilitate traversal (e.g., pushing or pulling) of a conductor, such as an electrical wiring, an electrical cable, a fiber optic wire, a fiber optic cable, a wire TYP, other communication or data transmission means, or combination thereof through an interior volume thereof without obstructing or damaging the conductor; (2) a continuous conduit that is configured to house a conductor in the interior volume thereof; and (3) a continuous conduit that is configured to be traversed through a cavity.

Figure 1:
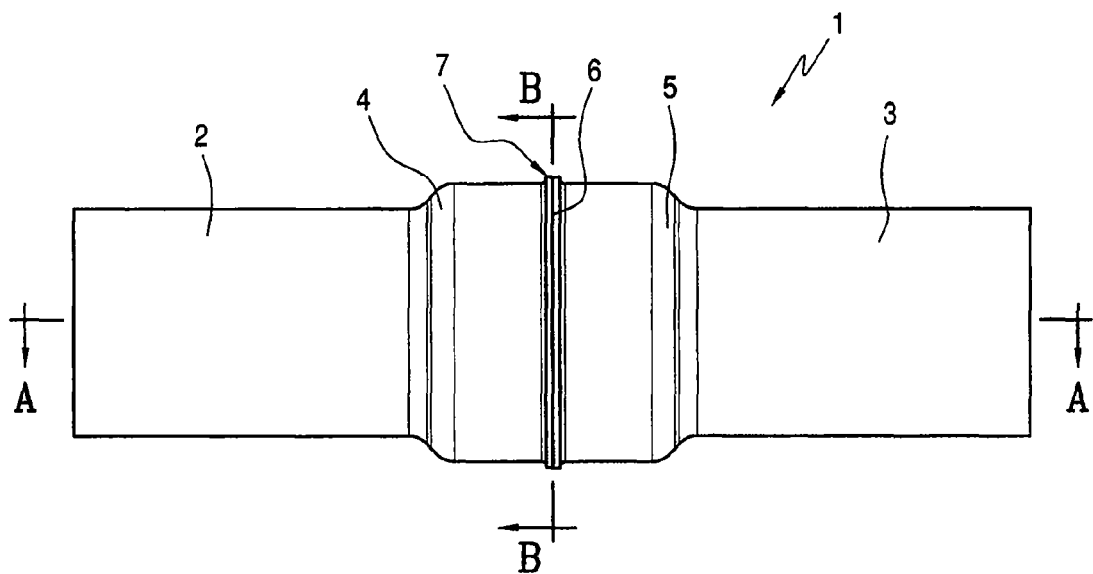
FIG. 1 is an external view of a portion of a continuous conduit according to an embodiment of the present invention.

FIG. 1 shows a portion of a continuous conduit or raceway 1 according to an embodiment of the present invention. The portion of the continuous conduit 1 shown in FIG. 1 includes a first conduit 2 and a second conduit 3 coupled together at a junction forming a joint 6.

The first conduit 2 and the second conduit 3 can be of any suitable configuration and of any suitable dimensions. For example, in FIG. 1, the first conduit 2 has a "straight run" or elongated portion and an enlarged end 4. Similarly, the second conduit 3 has a straight run or elongated portion and an enlarged end 5. Though not explicitly shown in FIG. 1, both ends of the first conduit 2 can have enlarged ends and both ends of the second conduit 3 can have enlarged ends. Additionally, non-coupled ends (i.e., conduits at ends of the continuous conduit 1) may have ends that are not enlarged.

Enlarged ends 4, 5 can be of any suitable configuration and of any suitable dimensions. Generally, the ends are "enlarged" in the sense that they have an inner diameter at ends thereof greater than an inner diameter of the straight run or elongated portion to which they are coupled. Moreover, the enlarged ends 4, 5 preferably do not have any portion thereof having an inner diameter equal to or less than the inner diameter of the straight run portion to which they are coupled. FIG. 1, for example, shows the enlarged ends 4, 5 being substantially bell-shaped or flared. The enlarged ends 4, 5 are coupled together to form the continuous conduit 1. The junction at which the enlarged ends are coupled together forms joint 6.

Enlarged end 4 and enlarged end 5 can be coupled together by any suitable means, such as fusing, welding, butt welding, gluing, etc. and can be performed by any suitable means, including, but not limited to, by automated machines, non-automated machines, manually, or combination thereof. In an embodiment of the present invention, the enlarged ends 4, 5 are fused together using the method substantially as described in the '051 patent and the '365 publication. Coupling the enlarged ends 4, 5 together can result in an outer protrusion 7 and an inner protrusion (not shown in FIG. 1) being formed at joint 6.

The outer protrusion 7 projects generally outwardly from the joint 6 by any suitable amount and can take any suitable form or shape. The outer protrusion 7 can be formed after coupling of the enlarged ends 4, 5. For example, the outer protrusion 7 can be formed to take a specific shape, to be reduced, or to be substantially removed.

Figure 2:
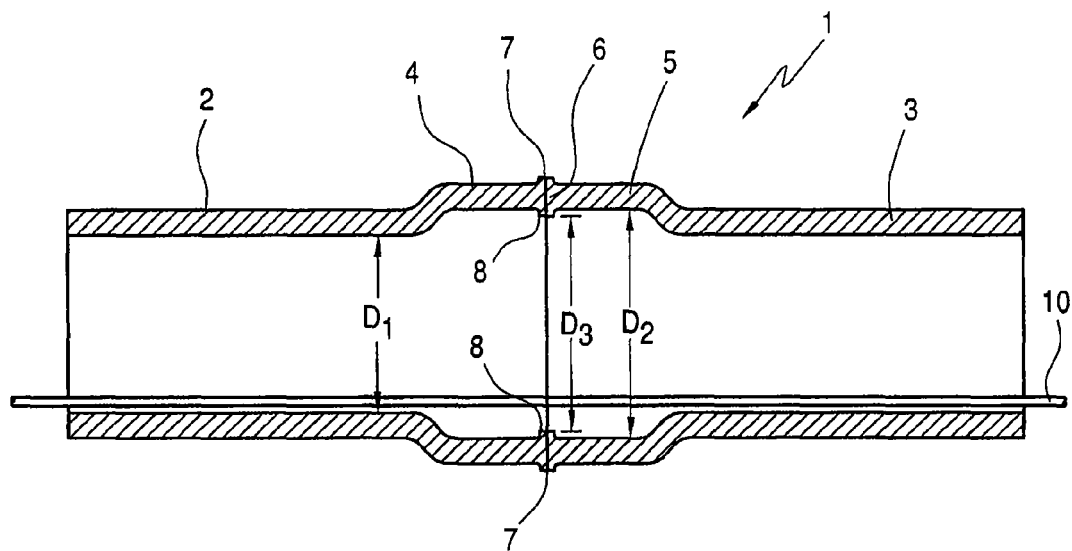
FIG. 2 is a cross sectional view of the continuous conduit portion shown in FIG. 1.

FIG. 2, is a cross sectional view of the continuous conduit 1 portion shown in FIG. 1. FIG. 2 shows the inner protrusion 8 formed on the inside of the conduits at joint 6. Inner protrusion 8 projects generally inwardly from the joint 6, along the entirety of the joint 6 (i.e., along the circumference) and can project inward by any suitable amount or take any suitable form or shape. For example, inner protrusion 8 can be an uneven, ragged bead or ridge. Inner protrusion 8 can be formed during or after the coupling of the enlarged ends 4, 5. In an embodiment of the present invention, the inner and outer protrusions are formed substantially as described in the '051 patent and the '365 publication.

FIG. 2 shows straight run portions of conduits 2, 3 having an inner diameter D1, the enlarged ends 4, 5 having an inner diameter D2, and the inner protrusion 8 having an inner diameter D3. In embodiments of the present invention, inner diameters D2 of the enlarged ends 4, 5 are sized based on the inner protrusion 8 (e.g., based on the inner diameter D3 of the inner protrusion 8) formed at the joint 6 and/or based on the inner diameter D1 of the straight run portions. Because of the enlarged ends 4, 5 at the joint 6, the inner protrusion 8 is positioned "outside" the inner diameter D1 of the straight run or non-belled portion of the conduits 2, 3. Put another way, the inner protrusion 8 is formed outside the length-wise path of the non-belled portions of the conduit 1. This may allow for a clear, unobstructed passage for the conductor 10 to be traversed or "run" through the continuous conduit 1 such that the conductor 10 does not contact the inner protrusion 8, and thereby avoiding being cut, pierced, or otherwise damaged. Moreover, conductor 10 can be traversed through continuous conduit 1 by any suitable means, such as by pulled, pushed, or otherwise "running" the conductor 10 through the continuous conduit 1. Additionally, FIG. 2 shows conductor 10 spanning a "valley" formed by the enlarged ends 4, 5 such that it does not contact the inner protrusion 8.

Figure 3:
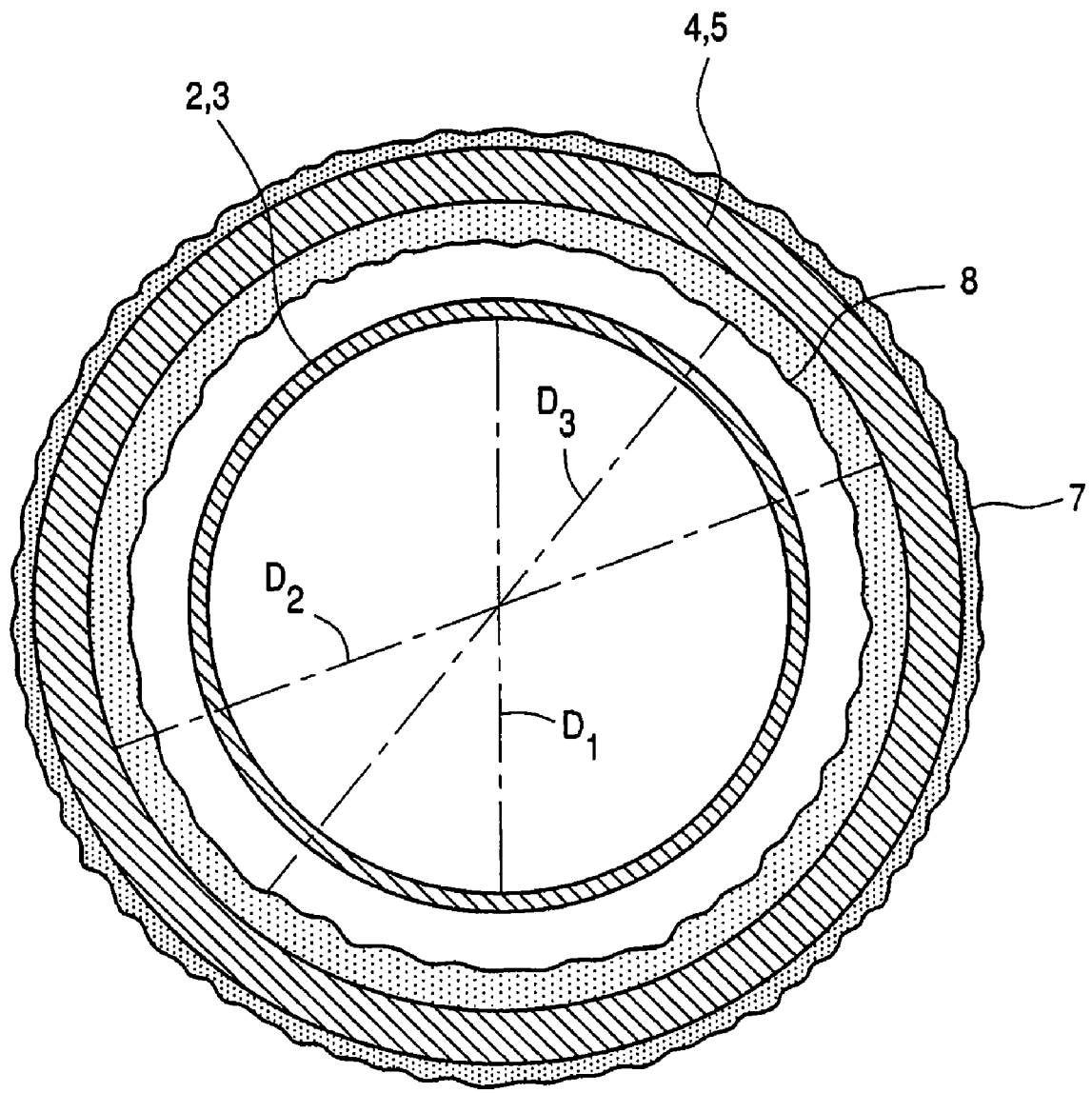
FIG. 3 is a cross sectional view the continuous conduit in FIG. 1 taken along line BB.

FIG. 3 is a cross sectional view the continuous conduit 1 along line BB of FIG. 1. As can be seen in FIG. 3, straight run portions (non-belled conduit portions) have an inner diameter D1, the enlarged ends 4, 5 have an inner diameter D2, and the inner protrusion 8 has an inner diameter of D3. The first enlarged end 4 and second enlarged end 5 each have an inner diameter D2 greater than that of the straight-run portions 2, 3. Moreover, inner protrusion 8 has an inner diameter D3 greater than inner diameter D1 and less than inner diameter D2. For example, first and second conduits 2, 3 can have straight run portions with an inner diameter D1 of 4 inches, the enlarged ends can have a diameter D2 of 4½ inches, and internal protrusion 8 can have an internal diameter D3 of 4¼ inches. In an aspect of the invention, the diameter D2 should be large enough such that internal protrusion 8 does not project inward to a position equal to or less than the diameter D1 of the non-belled portion of the conduits. For example, the maximum permitted inner diameter D3 should be at least greater than diameter D1.

Continuous conduit 1 (including first and second conduits 2, 3) can be comprised of any suitable composition or material, including any suitable formulation of composition or material. For example, in one embodiment, continuous conduit 1 is comprised of polyethylene. In another embodiment, continuous conduit 1 is comprised of polyvinylchloride (PVC). In yet another embodiment, continuous conduit 1 is comprised of metal. The continuous conduit 1 also can be a combination of compositions or materials.

Figure 4:
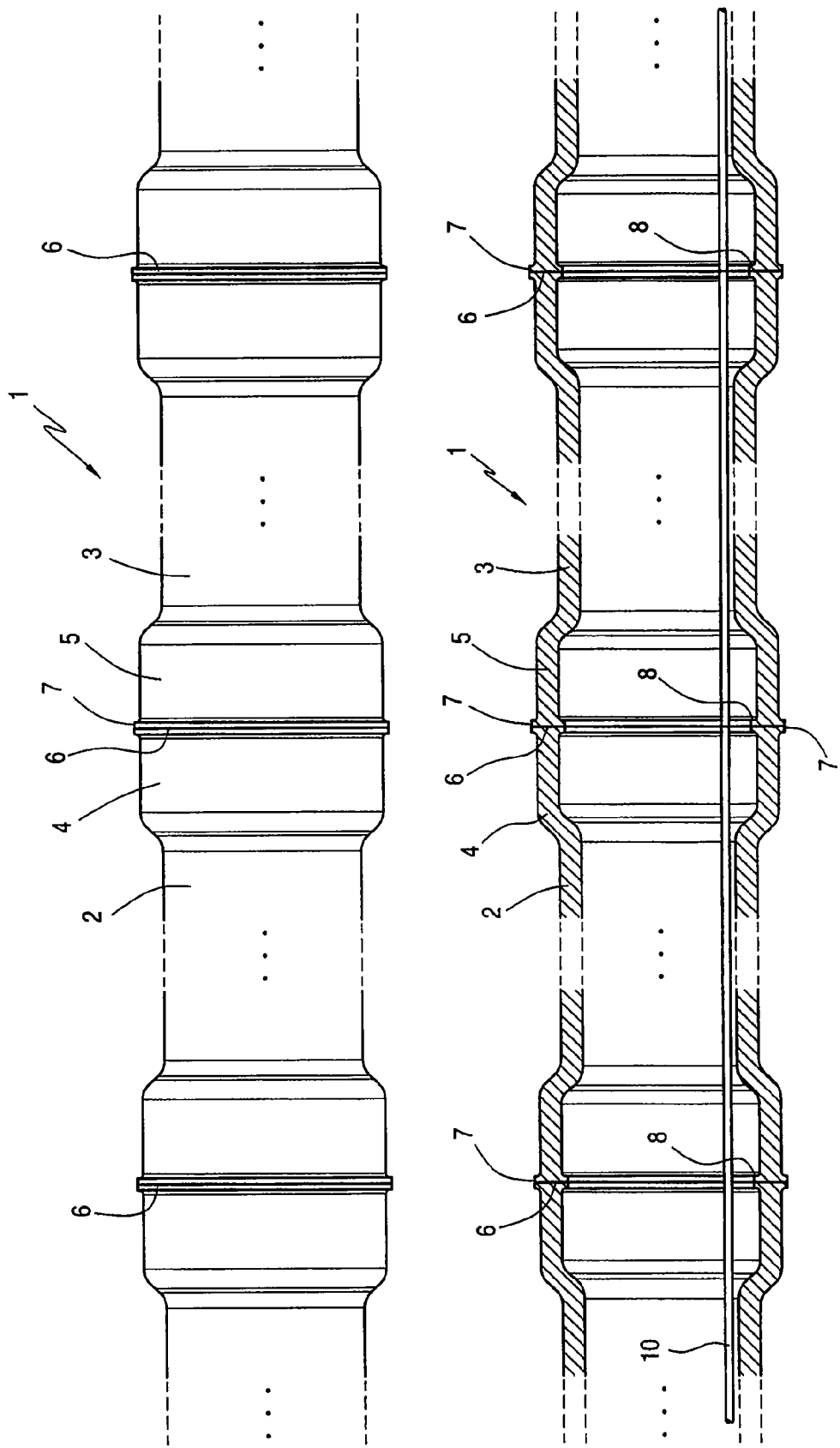
FIG. 4 shows a plurality of dual bell joints forming a continuous conduit according to an embodiment of the present invention, with the top illustration representing an external view and the bottom illustration representing a cross sectional view.

Though FIG. 1 and FIG. 2 show only first conduit 2 and second conduit 3, embodiments of the present invention are not limited to the coupling of only two conduits, and any suitable number of conduits can be coupled together in series. For example, FIG. 4 shows three coupling junctions or joints 6 and corresponding conduit pairs 2, 3. Each joint 6 can be formed with an internal protrusion 8 and an external protrusion 7. As can be seen from the lower cross sectional view in FIG. 4, the inner protrusion 8 of each of the joints does not extend radially inwardly to the inner diameter of the non-belled portion of the conduits. Thus, conductor 10 can be run through (e.g., pushed or pulled) the series of conduits without contacting any of the inner protrusions 8. Furthermore, conductor 10 can be housed or maintained within the conduits such that the conductor 10 rests on the straight run portions spanning the joint 6 without touching or contacting the inner protrusions 8.

Figure 5:
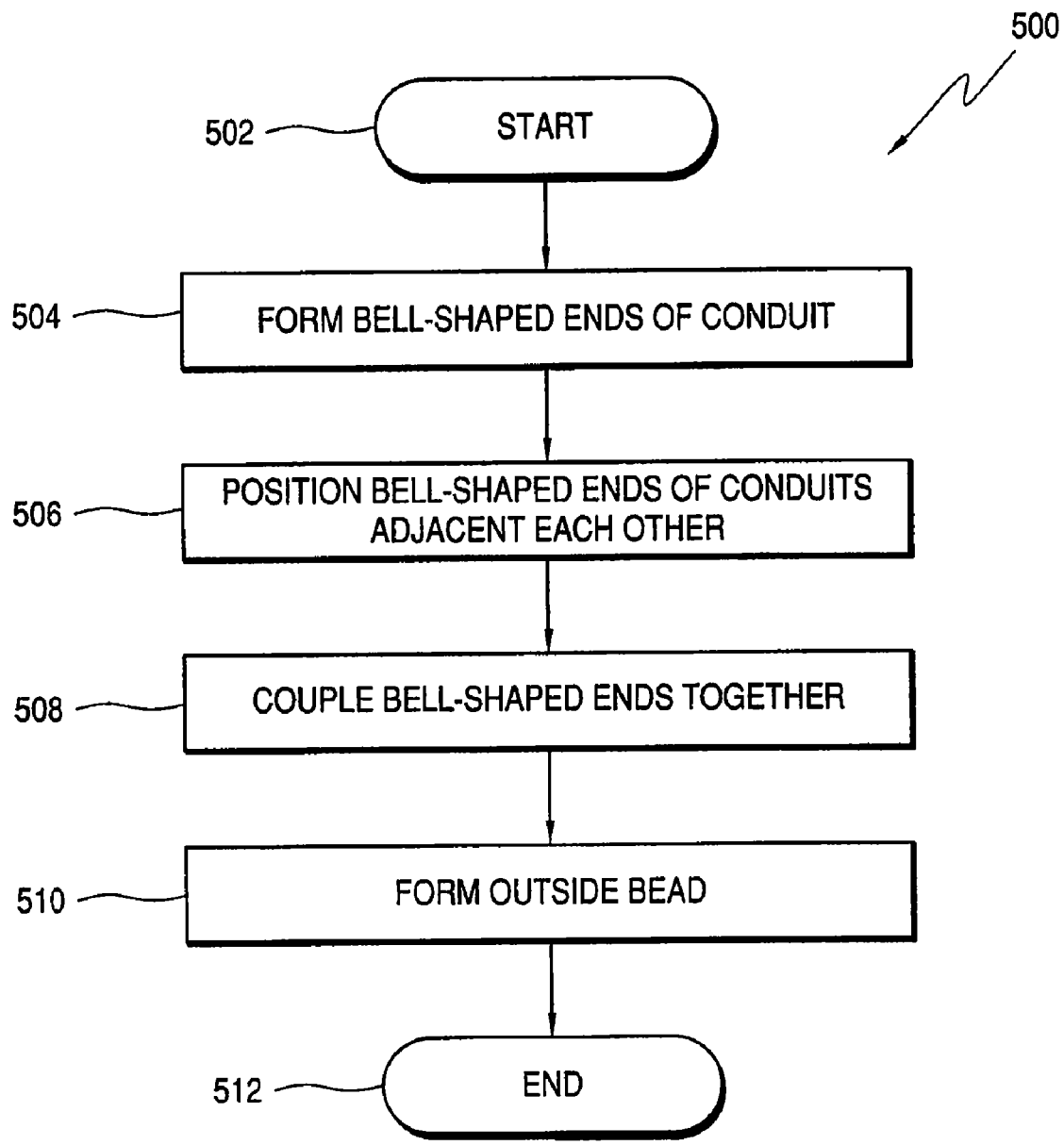
FIG. 5 is a flow chart representation of a method for forming a continuous conduit according to an embodiment of the present invention.

FIG. 5 is a flow chart representation of a method 500 for forming a continuous conduit from two or more individual conduits according to an embodiment of the present invention.

In FIG. 5, while the method 500 can start at 502 and proceed to any suitable step or operation, FIG. 5 shows the method proceeding from 502 to 504, which includes forming an enlarged portion at one or more ends of a conduit. If both ends of the conduit are to be enlarged, the ends can be enlarged substantially simultaneous or one at a time. If one at a time, one end can be enlarged, and then the conduit can be moved such that the other end can be enlarged. Alternatively, a means that performs the enlarging, such as a "beller," can be moved so as to enlarge the other end. Other conduit ends can also be enlarged simultaneously or in succession. Although the method 500 shows start 502 immediately followed by 504, 506 can immediately follow start 502, if the ends of the conduit are already bell-shaped or similarly enlarged.

The enlarged portion or portions can be of any suitable configuration and of any suitable dimensions. For example, the enlarged portion or portions can be bell-shaped or otherwise flared, wherein an inner diameter (i.e., D2) of an end or a "bottom" of the bell is larger than an inner diameter (i.e., D1) of the non-enlarged portion immediately adjacent a "top" of the bell.

After 504 the method can proceed to any suitable operation or step. FIG. 5 shows the method proceeding to 506. At 506, an enlarged end of a first conduit can be positioned adjacent an enlarged end of a second conduit such that respective circumferences of the enlarged ends (which are of substantially the same circumference) are substantially axially aligned. For example, the enlarged ends can be positioned for coupling by way of fusing substantially as described in the '051 patent. After 506, the method can proceed to any suitable step or operation. FIG. 5 shows the method proceeding to 508.

At 508, the positioned and aligned enlarged ends can be coupled together. The enlarged ends can be coupled together in any suitable way and by any suitable means. In an embodiment of the invention, the positioned and aligned ends are substantially permanently coupled together. Moreover, the enlarged ends can be coupled together by any suitable means, such as welding, fusing, gluing, etc. For example, in an embodiment of the invention, the enlarged ends are fused together using the method substantially as described in the '051 patent and the '365 publication. The coupling together forms a joint, such as a fuse joint or fused portion. Moreover, the joint can be substantially permanent and seamless.

In coupling the enlarged ends together to form a joint, external and internal protrusions, such as beads or ridges may be formed at the joint. The protrusions can take any suitable form and can protrude by any suitable amount. In preferred embodiments, however, the internal protrusion does not protrude or extend inwardly to a position equal to an inner diameter (i.e., D1) of the non-belled or straight-run portion of the coupled-together conduits. That is to say, the enlarged portions are sized (e.g., an inner diameter (i.e., D2) is sized) to accommodate the internal protrusion. Thus, a conductor passed through the continuous conduit may be prevented from contacting the internal protrusion. After 508, the method can proceed to any suitable step or operation. FIG. 5 shows the method proceeding to 510. Note, however, that 508 may be performed for any suitable number of first and second conduits to form a continuous conduit comprised of a plurality of first and second conduit pairs.

At 510, the method includes forming the external protrusion. The external protrusion can be formed into any suitable configuration or shape, by any suitable means, such as a grinder, milling apparatus, planer, cutting apparatus, etc. For example, the external protrusion can be reduced or substantially removed. Reducing or removing the external protrusion may allow for the continuous conduit to be traversed (e.g., pushed or pulled) through a cavity, such as a man-made cavity, including a hole, a trench, a ditch, etc., more efficiently. Additionally, the external protrusion can be formed to facilitate traversal through a cavity. For example, the external protrusion can be formed so as to prevent dirt from accumulating on a leading side thereof as the continuous conduit is traversed through the cavity.

After the continuous conduit has been positioned in a cavity, one or more conductors can be run through the interior of the joined conduits without obstruction and without contacting inner beads or ridges that could damage the conductors.

The invention having been described in certain embodiments, it will be apparent to those skilled in the art that many changes and alterations can be made without departing from the spirit or essential characteristics of the invention. Accordingly, Applicant intends to embrace all such alternatives, modifications, equivalents and variations that are within the spirit and scope of this invention.

What is claimed is:

1. A non-metallic raceway configured to facilitate passage of a conductor comprising:
   at least one pair of non-metallic hollow conduits, including a first non-metallic conduit and a second non-metallic conduit,
   the first and second non-metallic hollow conduits each having:
   a first belled end portion having belled inner and outer surfaces, the first belled end portion having a first inner diameter at an end thereof,
   a second belled end portion having belled inner and outer surfaces, the second belled end portion having the first inner diameter at an end thereof, and
   a cylindrical portion between the first and second belled end portions and with a second inner diameter,
   the first inner diameter being greater than the second inner diameter,
   the pair of non-metallic hollow conduits being fused together at respective ends of the first belled end portions to form a fused portion, the fused portion including an internal ridge and an external ridge, and the internal ridge having a third inner diameter, the pair of fused together conduits having uncovered outer surface portions of the cylindrical portions and an entire outer surface of the fused portion that is uncovered, the third inner diameter being greater than the second inner diameter and less than the first inner diameter, and the first, second, and third inner diameters being sized such that a conductor passed through the raceway does not contact the internal ridge, wherein the internal ridge extends inwardly more than the external ridge extends outwardly.

2. The non-metallic raceway of claim 1, further comprising a plurality of said pairs of non-metallic hollow conduits.

3. The non-metallic raceway of claim 1, wherein the first and the second non-metallic hollow conduits comprise polyethylene.

4. The non-metallic raceway of claim 1, wherein the first and the second non-metallic hollow conduits comprise polyvinylchloride ("PVC").

5. A method of forming a continuous conduit from a first hollow conduit and a second hollow conduit comprising:

positioning a bell-shaped end portion of the first hollow conduit adjacent a bell-shaped end portion of the second hollow conduit such that respective circumferences of ends of the hollow conduits are substantially axially aligned, each of said bell-shaped end portions having belled inner and outer surfaces; and substantially permanently fusing the positioned and aligned bell-shaped end portions together to form a fuse joint at the ends of the bell-shaped end portions, said substantially permanently fusing forming an internal protrusion at the fuse joint, the internal protrusion protruding substantially radially inward, the internal protrusion extending inwardly to an inner diameter greater than that of non-belled portions of the first hollow conduit and the second hollow conduit, and the substantially permanently fused first and second hollow conduits forming the continuous conduit have exposed outer surface portions of the non-belled portions and an entire outer surface of the fuse joint that is exposed and are configured so as to prevent a conductor passed through the continuous conduit from contacting the internal protrusion, wherein said substantially permanently fusing forms an external protrusion at the fuse joint, the external protrusion protruding substantially radially outward, wherein the method further comprises forming the external protrusion after said substantially permanently fusing, and wherein said forming the external protrusion includes reducing the external protrusion.

6. The method of claim 5, further comprising:
forming the bell-shaped end portion of the first hollow conduit;
forming a second bell-shaped end portion of the first hollow conduit;
forming the bell-shaped end portion of the second hollow conduit; and
forming a second bell-shaped end portion of the second hollow conduit.

7. The method of claim 5, further comprising:
traversing the continuous conduit through a man-made cavity; and
traversing a conductor along an inside of the continuous conduit such that the conductor does not contact the internal protrusion.

8. A method of forming a continuous conduit from a first hollow conduit and a second hollow conduit comprising:

positioning a bell-shaped end portion of the first hollow conduit adjacent a bell-shaped end portion of the second hollow conduit such that respective circumferences of ends of the hollow conduits are substantially axially aligned, each of said bell-shaped end portions having belled inner and outer surfaces; and substantially permanently fusing the positioned and aligned bell-shaped end portions together to form a fuse joint at the ends of the bell-shaped end portions, said substantially permanently fusing forming an internal protrusion at the fuse joint, the internal protrusion protruding substantially radially inward, the internal protrusion extending inwardly to an inner diameter greater than that of non-belled portions of the first hollow conduit and the second hollow conduit, and the substantially permanently fused first and second hollow conduits forming the continuous conduit have exposed outer surface portions of the non-belled portions and an entire outer surface of the fuse joint that is exposed and are configured so as to prevent a conductor passed through the continuous conduit from contacting the internal protrusion, wherein said substantially permanently fusing forms an external protrusion at the fuse joint, the external protrusion protruding substantially radially outward, wherein the method further comprises forming the external protrusion after said substantially permanently fusing, and wherein said forming the external protrusion includes substantially removing the external protrusion.

9. The method of claim 8, further comprising:
forming the bell-shaped end portion of the first hollow conduit;
forming a second bell-shaped end portion of the first hollow conduit;
forming the bell-shaped end portion of the second hollow conduit; and
forming a second bell-shaped end portion of the second hollow conduit.

10. The method of claim 8, further comprising:
traversing the continuous conduit through a man-made cavity; and
traversing a conductor along an inside of the continuous conduit such that the conductor does not contact the internal protrusion.

* * * * *